March 24, 1959     H. W. EASTON     2,878,703
FIXTURE FOR HANDLING LATHE CHUCKS
Filed Jan. 23, 1956
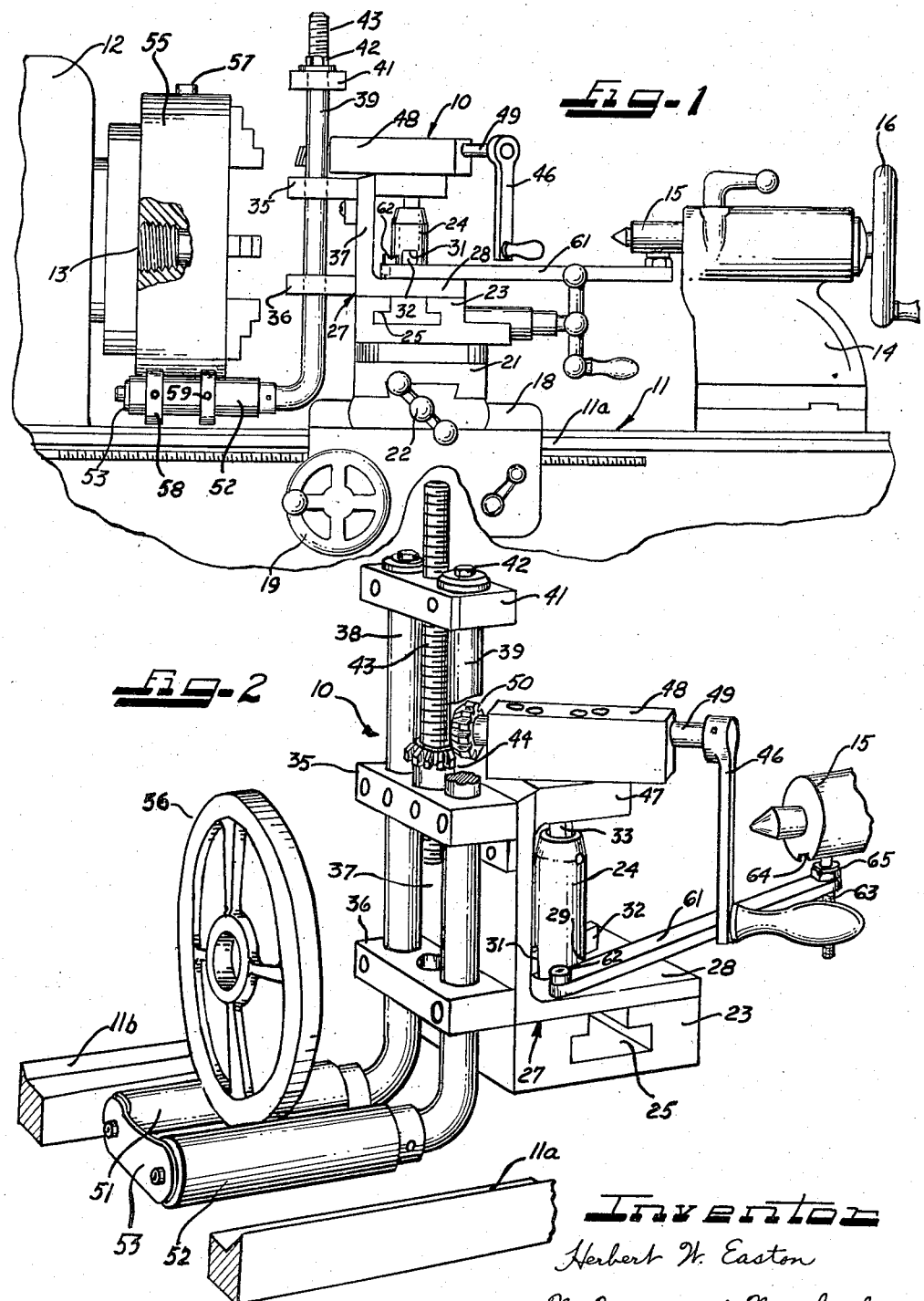
Inventor
Herbert W. Easton
McCanna and Morsbach
Atty's

2,878,703

FIXTURE FOR HANDLING LATHE CHUCKS

Herbert W. Easton, Rockford, Ill.

Application January 23, 1956, Serial No. 560,592

4 Claims. (Cl. 82—34)

This invention relates to an apparatus for mounting lathe chucks and face plates on a lathe.

The installation and removal of chucks and face plates from lathes has presented a difficult problem, particularly in the larger size lathes wherein the chucks and face plates are relatively heavy and cannot be easily handled by one man. In installing and removing the chucks or the like, it is necessary to support the chuck in proper alignment with the lathe spindle and then rotate either the chuck or the spindle to thread the former onto the spindle. If the chuck is not properly supported in alignment with the spindle, the chuck may bind on the threads of the spindle as the chuck is screwed on or off the spindle and thus damage the threads. Moreover, the chuck may fall, if not properly supported, thereby damaging the chuck, lathe bed, or both.

An important object of this invention is to provide an improved support fixture for handling chucks or face plates and adapted for mounting on the cross slide of a lathe for movement therewith longitudinally and laterally of the lathe spindle.

Another object of this invention is to provide a lathe chuck mounting fixture arranged for mounting on the lathe cross slide without any modification in the construction of the lathe.

A more particular object of this invention is to provide a fixture for mounting lathe chucks and the like and arranged to be detachably clamped to the cross slide by the tool clamping mechanism on the tool holder, to thereby enable rapid attachment and detachment of the fixture from the lathe.

A further object of this invention is to provide a fixture for mounting lathe chucks and the like arranged to handle all sizes of chucks and face plates which are used on the lathe and which has provision for counteracting the overbalance on the cross slide, due to the weight of the chuck when the latter is carried by the fixture.

These, together with various ancillary objects and advantages of this invention will be more readily appreciated as the same becomes better understood by reference to the following detailed description when taken in connection with the accompanying drawings wherein:

Fig. 1 is a fragmentary side elevational view of a lathe having the chuck handling fixture thereon; and Fig. 2 is a fragmentary perspective view of the lathe and the chuck handling fixture.

The chuck handling fixture of the present invention, designated generally by the numeral 10 is adapted for mounting on any conventional lathe such as shown in Fig. 1. In general, the lathe includes a lathe bed 11 having spaced ways 11a and 11b. A headstock 12 is provided at one end of the bed and includes suitable mechanism (not shown) for driving the headstock spindle 13. A tailstock 14 is provided adjacent the other end of the bed and includes a tailstock spindle 15 which is mounted in the tailstock for longitudinal sliding movement. A crank or the like 16 is provided for adjusting the position of the tailstock spindle 15 longitudinally of the bed.

A carriage 18 is mounted on the lathe bed for longitudinal movement thereon and a suitable mechanism including the crank 19 is provided for positively adjusting the position of the carriage along the lathe bed. A cross slide 21 is mounted on the carriage for movement transversely of the lathe bed and a crank 22 is provided for positively adjusting the position of the cross slide relative to the carriage. In the form of the lathe shown, a compound rest 23 is mounted on the cross slide for movement with the latter and a tool post 24 is mounted on T-slot 25 formed in the compound, it being understood that the tool post may, in some form of lathes, be mounted directly on the cross slide.

The fixture 10 includes an L-shaped mounting bracket 27 having one leg 28 thereof adapted to rest on the top of the compound rest 23 and preferably dimensioned to extend coextensively with the upper surface of the compound rest. An opening 29 is formed in the leg 28 for the reception of the tool post 24 and, when the fixture is mounted on the lathe, the tool post extends upwardly through the opening as clearly shown in Figs. 1 and 2. The tool post, as is conventional, is provided with a slot 31 adapted to receive the cutting tool holder. In accordance with the present invention, a bar 32 is disposed in the slot 31 and overlies the leg 28 of the mounting bracket. The tool clamping stud 33, normally provided in the tool post, is arranged to engage the bar 32, when the stud is tightened, to thereby firmly yet detachably clamp the mounting bracket to the compound 23.

A pair of spaced guide blocks 35 and 36 are attached to or formed integrally with the other leg 37 of the mounting bracket 27 and a pair of L-shaped members 38 and 39 are mounted on the guide blocks for vertical sliding movement relative thereto. A cross head 41 is attached to the upper ends of the L-shaped members 38 and 39 as by fasteners 42 and a screw 43 is threaded into the cross head between the members 38 and 39. The other end of the screw 43 is rotatably supported in the upper guide member 35 and has a gear 44 affixed thereto and arranged to rotate the screw in response to rotation of the gear. The gear 44 abuts against the upper guide member 35 whereby the cross piece 41, which is threadedly connected to the screw, is raised and lowered in response to turning of the gear 44. The gear 44 is arranged to be turned by means of a crank 46 and for this purpose a plate 47 is affixed to the leg 37 of the mounting bracket. A shaft supporting block 48 is affixed to the plate 47 and the crank shaft 49 rotatably extends through the block. A gear 50 is provided on the end of the shaft 47 remote from the crank and in meshing engagement with the gear 44 to turn the latter in response to turning of the crank.

The L-shaped members 38 and 39 have horizontally extending legs disposed at one side of the mounting bracket and rollers 51 and 52 are rotatably supported on the horizontally extending legs. A bracket 53 is attached to the forward ends of the horizontally extending legs and extends therebetween to maintain the legs in spaced parallel relation. As is apparent from the drawings, the rollers 51 and 52 are arranged to support a lathe chuck 55 (Fig. 1) or face plate 56 (Fig. 2) at the periphery thereof. The spacing of the support members 38 and 39 is arranged such that the rollers 51 and 52 thereon may extend between the ways 11a and 11b of the lathe bed to thereby enable mounting of relatively large face plates which extend into closely spaced adjacency to the lathe bed when mounted on the spindle 13.

In some chucks, the jaw adjusting screws 57 project slightly beyond the periphery of the chuck. In order to support such chucks on the rollers, a pair of rings or tires 58 are provided on each roller. These rings are preferably slidably supported on the rollers 52 and may be locked in adjusted position thereon by set screws 59. As is apparent from Fig. 1, the rings are spaced apart on the rollers to engage the periphery of the chuck at opposite sides of the jaw adjusting screw. When the device is used for mounting face plates or chucks in which the jaw adjusting screws do not extend beyond the periphery of the chuck, the rings may be moved to one end of the rollers or completely removed therefrom.

From the foregoing, it is apparent that the fixture is movable with the cross slide longitudinally and laterally of the spindle 13 to thereby position the chuck or face plate carried on the rollers 51 and 52 in lateral alignment with the spindle and in close proximity thereto. The crank 46 is operable to elevate and lower the support members 38 and 39 to thereby move the chuck carried on the rollers into axial alignment with the lathe spindle. When the chuck or face plate is properly aligned with the lathe spindle, either the chuck or the spindle may be turned, one relative to each other, to thread the chuck onto the spindle. During this operation, the chuck rotates freely on the rollers 51 and 52.

Since the chuck or face plate is mounted wholly at one side of the carriage, this produces an overhang on the cross slide and carriage which, when handling relatively heavy chucks or face plates, may tend to cause damage to the guideways on the lathe compound and cross slide. In accordance with the present invention, provision is made for counteracting the overbalance on the chuck handling fixture. For this purpose there is provided an arm 61 which is mounted on the leg 28 of the mounting bracket by means of a stud 62 for horizontal swinging movement relative thereto. The arm 61 guidably engages the mounting bracket and extends therefrom in a direction opposite the rollers 51 and 52. Provision is made at the other end of the arm 61 for slidably engaging the lathe to provide a support for the fixture and, in the form shown in the drawings, there is provided a follower screw 63 which is threaded in the arm 61 and arranged for engagement with the keyway 64 formed in the underside of the tailstock spindle 15. A lock nut 65 is provided for locking the screw 63 in any preselected adjusted position. The arm 61 is free to pivot horizontally about the stud 62, as the cross slide is moved crosswise of the lathe bath, and the screw 63 slides relative to the tailstock spindle 15 as the carriage is moved longitudinally of the bed. There is thus provided a support arm for counteracting the overhang on the carriage and cross slide, due to the weight of the chuck carried by the tool handling fixture, and which arm is arranged to accommodate the lateral and longitudinal shifting movement of the carriage and cross slide.

The fixture 10 may also be used, without modification of its construction, to support large pieces of stock when mounting the same in the chuck. When mounting long pieces of stock, the fixture 10 is turned through 90° from the position shown in Fig. 1 so that the rollers 52 extend crosswise of the lathe bed. This may be achieved either by turning the compound 23 or by turning the mounting bracket 28 relative to the compound. The lateral position of the fixture is adjusted by the cross slide 21. The rings 58 may be used on the rollers to prevent dislodging of the stock from the rollers.

I claim:

1. In combination with a lathe including spaced ways defining a lathe bed, a lathe spindle disposed above said bed and extending in a direction longitudinally thereof, a carriage mounted on said bed for movement therealong toward and away from said spindle, a cross slide mounted on said carriage for movement crosswise of said bed; a fixture for mounting lathe chucks and face plates on said spindle comprising a mounting bracket including a base and an upwardly extending portion adjacent one side of said base, means detachably clamping said base to said cross slide, a pair of L-shaped rods, means on said upwardly extending portion of said bracket for supporting one leg of each of said L-shaped rods thereon for vertical sliding movement, the other legs of said rods extending horizontally outwardly from one side of said bracket, said other legs being disposed in a common horizontal plane in parallel spaced relation to said spindle, rollers on each of said other legs for rotatably supporting a chuck or face plate thereon, the distance between the outer edges of the rollers being less than the spacing between the ways of said lathe bed to permit vertical movement of said other legs to a level below said ways when handling large face plates, and manually operable means on said bracket operatively engaging said L-shaped members for raising and lowering said members.

2. In combination with a lathe including spaced ways defining a lathe bed, a lathe spindle disposed above said bed and extending in a direction longitudinally thereof, a carriage mounted on said bed for movement therealong toward and away from said spindle, a cross slide mounted on said carriage for movement crosswise of said bed; a fixture for mounting lathe chucks and for plates on said spindle comprising a mounting bracket including a base and an upwardly extending portion adjacent one side of said base, means detachably clamping said base to said cross slide, a pair of L-shaped rods, means on said upwardly extending portion of said bracket for supporting one leg of each of said L-shaped rods thereon for vertical sliding movement, the other legs of said rods extending horizontally outwardly from one side of said bracket, said other legs being disposed in a common horizontal plane in parallel spaced relation to said spindle, rollers on each of said other legs for rotatably supporting a chuck or face plate thereon, the distance between the outer edges of the rollers being less than the spacing between the ways of said lathe bed to permit vertical movement of said other legs to a level below said ways when handling large face plates, a cross head attached to the upper ends of said L-shaped rods and extending therebetween, a vertically extending screw disposed between said rods and operatively connected to said bracket and to said cross head for raising and lowering said rods in response to turning of said screw, a crank mounted on said bracket for rotation about a horizontal axis extending obliquely to a plane through said one leg of said rods, and gears operatively connecting said crank to said screw.

3. The combination of claim 1 including an arm mounted on said base of the bracket for horizontal swinging movement, and means on the other end of said arm for slidably engaging the lathe to counteract the overbalance on the fixture due to the weight of the chuck carried thereon.

4. A fixture for mounting lathe chucks and the like on a lathe spindle comprising, an L-shaped bracket, means for mounting one leg of said bracket on a lathe cross slide for movement therewith longitudinally and transversely to the lathe bed, the other leg of said bracket extending upwardly from said one leg thereof, a pair of L-shaped rods, guide means on said other leg of said L-shaped bracket for mounting one leg of each of said rods for vertical sliding movement thereon, a roller mounted on the other leg of each of said rods, said rollers extending horizontally outwardly from one side of said bracket and disposed in a common horizontal plane in close parallel spaced relation to be receivable between the ways of the lathe bed, a cross head attached to the upper ends of said L-shaped rods, a vertically extending screw disposed between said rods and operatively connected to said head and to said bracket to elevate and lower said rods in response to rotation of said screw, a crank mounted on said bracket for rotation about a horizontal axis extending obliquely to the plane of said other leg of said bracket to permit operation of the crank when the operator is stationed at the front of the lathe, and gear means on said crank and screw for rotating the screw.

References Cited in the file of this patent

UNITED STATES PATENTS

| | | |
|---|---|---|
| 809,717 | Mong | Jan. 9, 1906 |
| 1,232,801 | Hjorth | July 10, 1917 |
| 2,203,162 | Lee | June 4, 1940 |
| 2,236,437 | Mackowiak | Mar. 25, 1941 |
| 2,324,561 | Cripe | July 20, 1943 |
| 2,369,280 | Carr | Feb. 13, 1945 |
| 2,514,781 | Miller | July 11, 1950 |
| 2,545,440 | Barber | Mar. 20, 1951 |
| 2,583,917 | Wiegant | Jan. 29, 1952 |
| 2,608,909 | Quinn | Sept. 2, 1952 |